(12) United States Patent
Lee et al.

(10) Patent No.: US 8,040,477 B2
(45) Date of Patent: Oct. 18, 2011

(54) ARRAY SUBSTRATE, LIQUID CRYSTAL DISPLAY PANEL, AND METHOD OF MANUFACTURING THE SAME

(75) Inventors: Jun-Hyup Lee, Seoul (KR); Yeo-Geon Yoon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 221 days.

(21) Appl. No.: 11/958,193

(22) Filed: Dec. 17, 2007

(65) Prior Publication Data

US 2008/0158459 A1    Jul. 3, 2008

(30) Foreign Application Priority Data

Dec. 27, 2006   (KR) .................. 10-2006-0135303

(51) Int. Cl.
*G02F 1/1337*   (2006.01)
*G02F 1/136*   (2006.01)
(52) U.S. Cl. .................................... 349/123; 349/43
(58) Field of Classification Search .................. 349/43, 349/123
See application file for complete search history.

(56) References Cited

U.S. PATENT DOCUMENTS

| 5,949,509 | A | * | 9/1999 | Ohe et al. ................... 349/123 |
| 7,118,787 | B2 | * | 10/2006 | O'Neill et al. ................ 428/1.2 |
| 2002/0057408 | A1 | * | 5/2002 | Nishiyama et al. ........... 349/123 |
| 2004/0091641 | A1 | * | 5/2004 | Moon et al. .................. 428/1.1 |
| 2007/0154659 | A1 | * | 7/2007 | Yoon ............................ 428/1.26 |

FOREIGN PATENT DOCUMENTS

| JP | 2001-021891 | 1/2001 |
| JP | 2004-053784 | 2/2004 |
| KR | 100203304 | 3/1999 |

* cited by examiner

*Primary Examiner* — Mark Robinson
*Assistant Examiner* — Erin Chiem
(74) *Attorney, Agent, or Firm* — Innovation Counsel LLP (57) ABSTRACT

In a liquid crystal display panel, an array substrate includes a pixel electrode including a conductive organic material provided with an alignment pattern formed thereon. The pixel electrode serves as an electrode that receives a pixel voltage and as an alignment layer that aligns liquid crystal molecules. Thus, the array substrate does not need to have a separate alignment layer in order to align the liquid crystal molecules, thereby reducing manufacturing cost and process complexity and enhancing productivity.

7 Claims, 9 Drawing Sheets

ARRAY SUBSTRATE, LIQUID CRYSTAL DISPLAY PANEL, AND METHOD OF MANUFACTURING THE SAME

CROSS-REFERENCE TO RELATED APPLICATION

This application relies for priority upon Korean Patent Application No. 2006-135303 filed on Dec. 27, 2006, the contents of which are herein incorporated by reference in its entirety.

BACKGROUND OF THE INVENTION

1. Field of the Invention

The present invention relates to a liquid crystal display panel and, more particularly, to a liquid crystal display panel having an improved and more easily manufactured an array substrate and a color filter substrate.

2. Description of the Related Art

In general, a liquid crystal display includes a liquid crystal display panel for displaying an image and a backlight assembly providing the liquid crystal display panel with light. The liquid crystal display panel includes an array substrate, a color filter substrate facing the array substrate and a liquid crystal layer interposed between the array substrate and the color filter substrate. The array substrate includes a plurality of pixels each of which includes a thin film transistor and a pixel electrode. The thin film transistor switches the pixel voltage applied to the pixel electrode which faces a common electrode arranged on the color filter substrate. The pixel electrode receives the pixel voltage from the drain electrode of the thin film transistor. The color filter substrate includes a color filter layer having color pixels corresponding to the pixels.

The array substrate and the color filter substrate include a plurality of thin layers each which is patterned through an etching process using a mask. As a result, number of the masks increases in accordance with the increase in the number of thin layers, so that a manufacturing cost and a process complexity increase.

SUMMARY OF THE INVENTION

The present invention, according to one aspect, includes a liquid crystal display having an array substrate and a color filter substrate capable of reducing manufacturing cost and process complexity by providing at least one of the common electrode and the pixel electrode, advantageously fabricated of polyimide that is made conductive by krypton-fluoride laser radiation, with an alignment pattern so that a separate alignment layer is not required to align the liquid crystal molecules.

According to one aspect of the present invention, an array substrate for a liquid crystal display includes a base substrate, a thin film transistor, and a pixel electrode. The pixel electrode includes a conductive organic material and is provided with an alignment pattern formed thereon in order to align a liquid crystal. The conductive organic material includes a conductive polyimide material.

According to another aspect of the present invention, a substrate for a liquid crystal display includes a base substrate and a common electrode which receives a common voltage. The common electrode includes a conductive polyimide material and is provided with an alignment pattern for aligning the liquid crystal molecules.

The substrate may further include a color filter interposed between the base substrate and the common electrode to display a predetermined color of light.

According to a further another aspect of the present invention, a liquid crystal display panel includes an array substrate, an opposite substrate and a liquid crystal layer. The array substrate includes a first base substrate, a thin film transistor located on the first base substrate to switch a pixel voltage, and a pixel electrode electrically connected to the thin film transistor and provided with a first alignment pattern formed thereon. The opposite substrate includes a second base substrate facing the first base substrate, and a common electrode located on the second base substrate and provided with a second alignment pattern formed thereon. The liquid crystal layer is interposed between the array substrate and the opposite substrate and aligned by the first and second alignment patterns. The liquid crystal layer controls the transmittance of light passing therethrough in accordance with the electric field generated by the pixel voltage and the common voltage. The pixel electrode and the common electrode include a conductive polyimide material.

In still another aspect of the present invention, a method of manufacturing an array substrate for a liquid crystal display is provided that includes forming a thin film transistor on a base substrate so that a pixel electrode on the base substrate is electrically connected to the thin film transistor. The pixel electrode may include a conductive organic material and an alignment pattern formed on the pixel electrode to align the liquid crystal molecules.

In order to form the pixel electrode on the base substrate, an alignment layer including polyimide is coated on the base substrate. Then, a light is irradiated onto the alignment layer such that the alignment layer becomes electrically conductivity. The alignment layer may be coated onto the base substrate by an inkjet method, and the light includes a krypton fluoride laser.

In still another aspect of the present invention, a method of manufacturing a liquid crystal display panel is provided as follows.

A thin film transistor is formed on a first base substrate to switch the pixel voltage. Then, a pixel electrode is formed on the first base substrate, and the pixel electrode is electrically connected to the thin film transistor and provided with a first alignment pattern formed thereon to align a liquid crystal. A common electrode is formed on a second base substrate to receive a common voltage, and the common electrode is provided with a second alignment pattern to align the liquid crystal. A liquid crystal layer is formed between the pixel electrode and the common electrode.

According to the above, the pixel electrode and the common electrode include the conductive polyimide material and are provided with the alignment pattern formed thereon, respectively. Thus, the liquid crystal display panel does not need to have the separate alignment layer, so that the manufacturing cost and the process complexity may be reduced and the productivity may be enhanced.

BRIEF DESCRIPTION OF THE DRAWINGS

The above and other advantages of the present invention will become readily apparent by reference to the following detailed description when considered in conjunction with the accompanying drawings, in which.

DESCRIPTION OF THE EMBODIMENTS

Hereinafter, the present invention will be explained in detail with reference to the accompanying drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 1:
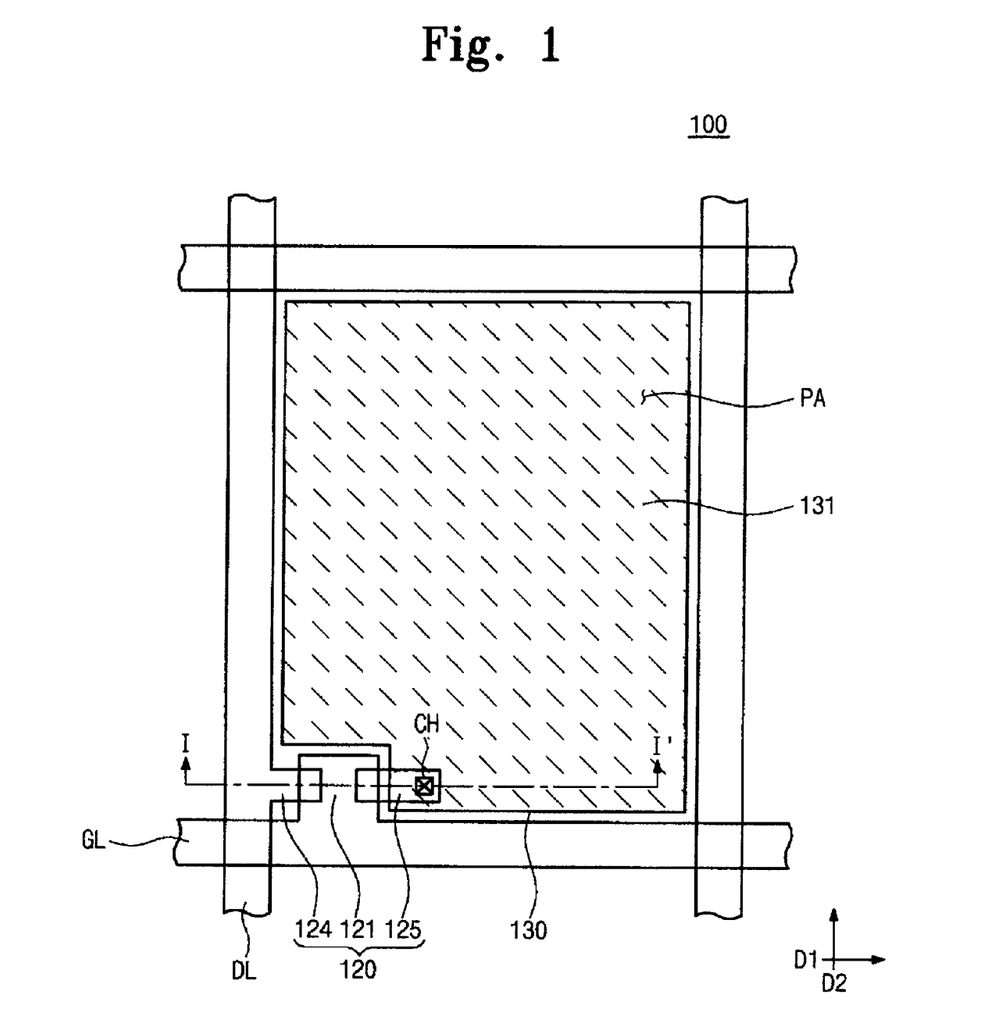
FIG. 1 is a plan view showing an exemplary embodiment of an array substrate for a liquid crystal display panel according to the present invention.
Figure 2:
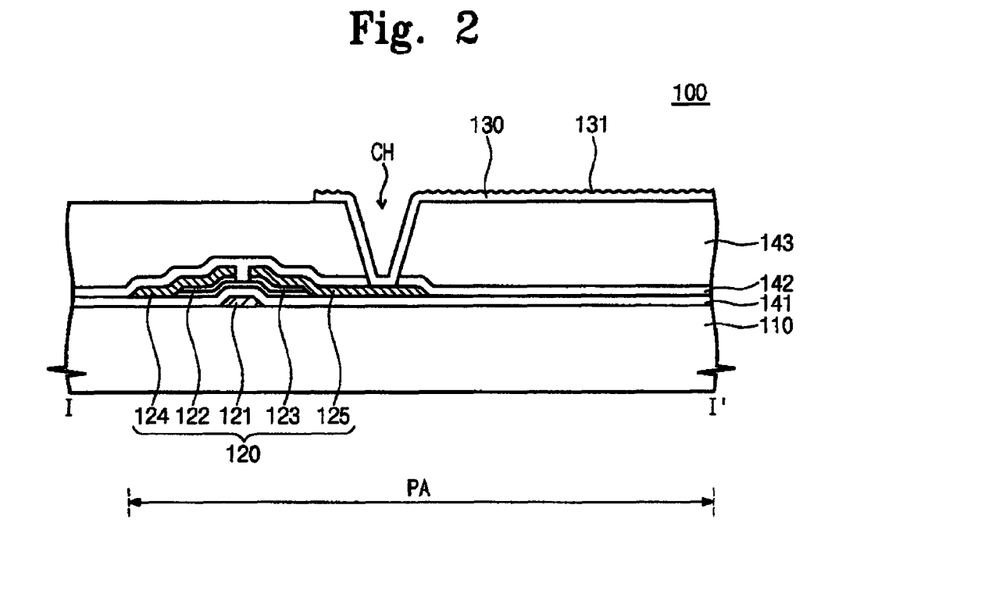
FIG. 2 is a cross-sectional view taken along a line I-I' of FIG. 1.

FIG. 1 is a plan view showing an exemplary embodiment of an array substrate for a liquid crystal display panel according to the present invention, and FIG. 2 is a cross-sectional view taken along a line I-I' of FIG. 1.

Referring to FIGS. 1 and 2, an array substrate 100 includes a first base substrate 110, a gate line GL, a data line DL, a thin film transistor 120 and a pixel electrode 130.

The first base substrate 110 includes a plurality of pixel regions PA on which an image is displayed and each of the pixel regions PA is defined by the gate line GL and the data line DL. The gate line GL arranged on the first base substrate 110 extends in a first direction D1 to transmit a gate signal. The data line DL arranged on the first base substrate 110 extends in a second direction D2 substantially perpendicular to the first direction D1. The data line DL is insulated from and intersects the gate line GL.

A thin film transistor 120 and a pixel electrode 130 are formed in each pixel region PA. The thin film transistor 120 includes a gate electrode 121 branched from the gate line GL, an active layer 122 and an ohmic contact layer 123 sequentially formed on the gate electrode 121, a source electrode 124 branched from the data line DL and formed on the ohmic contact layer 123, and a drain electrode 125 formed on the ohmic contact layer 123 and spaced apart from the source electrode 124.

The pixel electrode 130 is electrically connected to the drain electrode 125 to receive the pixel voltage through the thin film transistor 120. The pixel electrode 130 includes a conductive organic material, for example a conductive polyimide material. The pixel electrode 130 is provided with a first alignment pattern 131 formed thereon to align the liquid crystal molecules. Thus, the array substrate 100 does not need to have a separate alignment layer applied thereto when a pixel electrode including indium tin oxide or indium zinc oxide is applied to the array substrate 100. As a result, the manufacturing process and cost for the array substrate 100 may be reduced, thereby improving productivity.

The array substrate 100 further includes a gate insulation layer 141, a protection layer 142, and an organic insulation layer 143. The gate insulation layer 141 is formed on the first base substrate 110 to cover the gate line GL and the gate electrode 121. The protection layer 142 and the organic insulation layer 143 are sequentially formed on the gate insulation layer 141 to cover the data line DL and the thin film transistor 120. The protection layer 142 and the organic insulation layer 143 are provided with a contact hole CH formed therethrough to partially expose the drain electrode 125.

Hereinafter, a method of forming the pixel electrode 130 will be described in detail with reference to drawings.

Figure 3A:
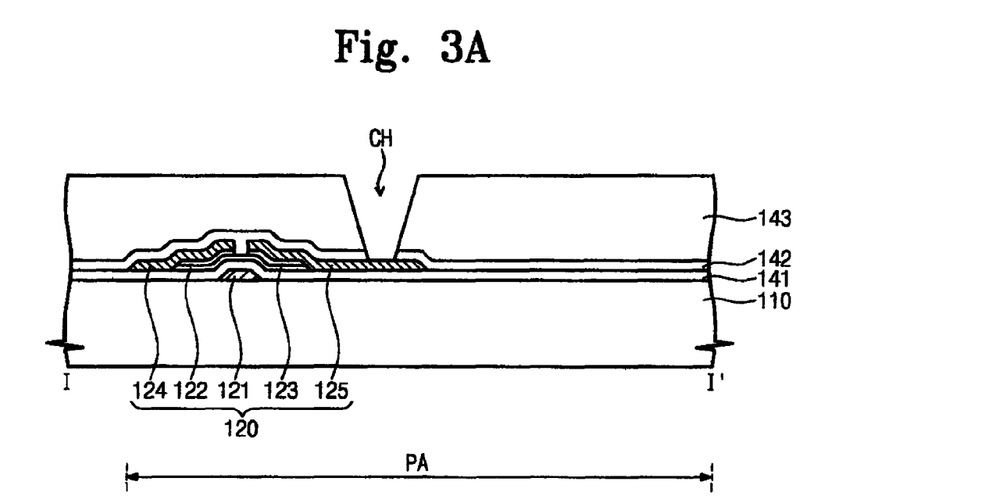
FIGS. 3A to 3D are sectional views illustrating a method of forming the array substrate shown in FIG. 2.
Figure 3B:
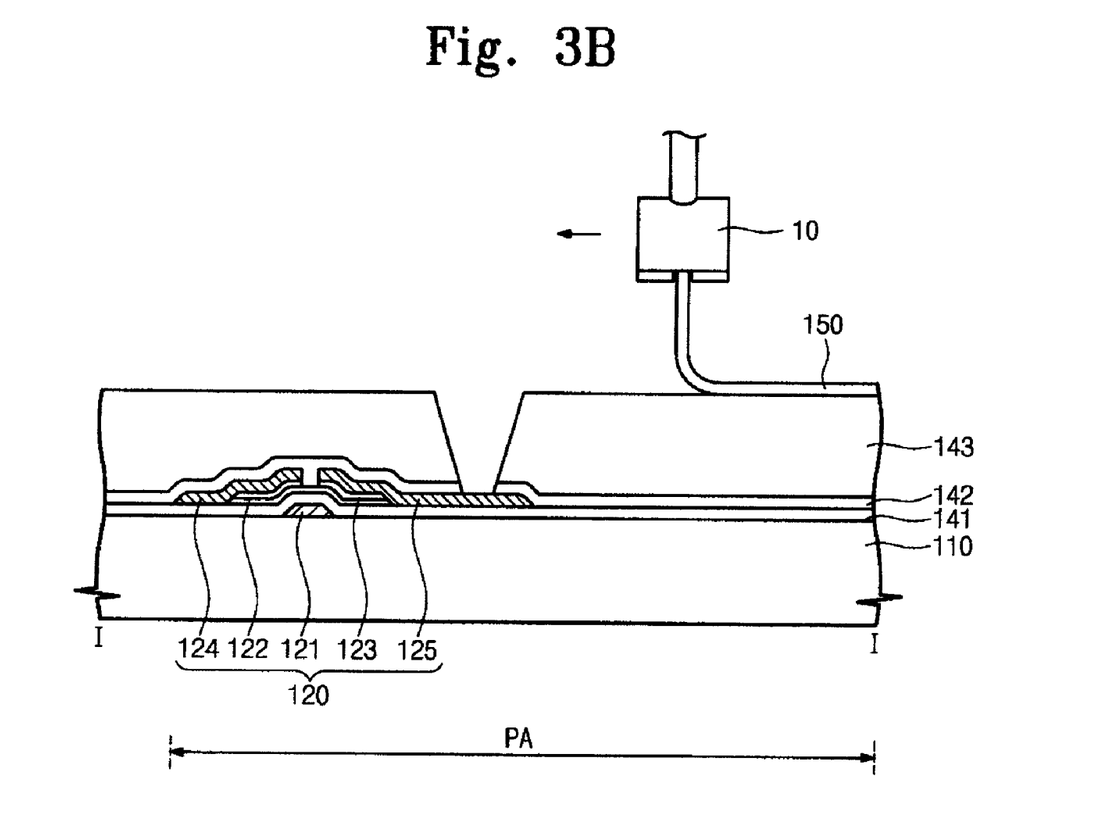
Figure 3C:
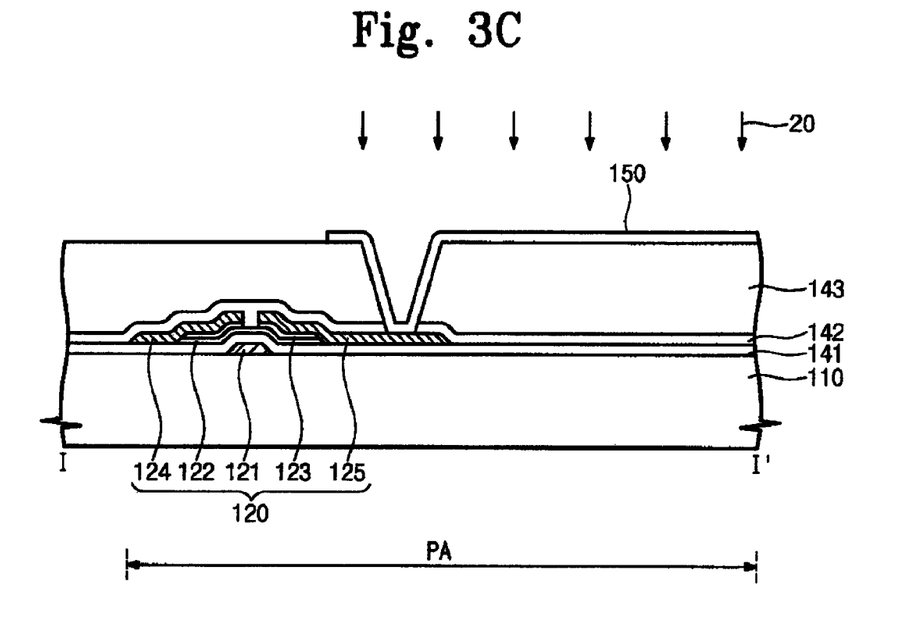

FIGS. 3A to 3C are sectional views illustrating a method of forming the array substrate shown in FIG. 2.

Referring to FIG. 3A, the thin film transistor 120, the gate insulation layer 141, the protection layer 142 and the organic insulation layer 143 are sequentially formed on the first base substrate 110. The protection layer 142 and the organic insulation layer 143 are partially removed to form the contact hole CH through which the drain electrode 125 is exposed.

Referring to FIG. 3B, in order to coat a thin layer on the organic insulation layer 143, an inkjet device (not shown) is disposed on the organic insulation layer 143 such that an inkjet head part 10 of the inkjet device faces the organic insulation layer 143. In the present exemplary embodiment, the inkjet device contains an alignment agent including polyimide which is discharged through the inkjet head part 10.

The inkjet head part 10 applies the alignment agent onto the organic insulation layer 143 while moving along a predetermined direction to form a first alignment layer 150 in each pixel region PA.

Figure 3D:
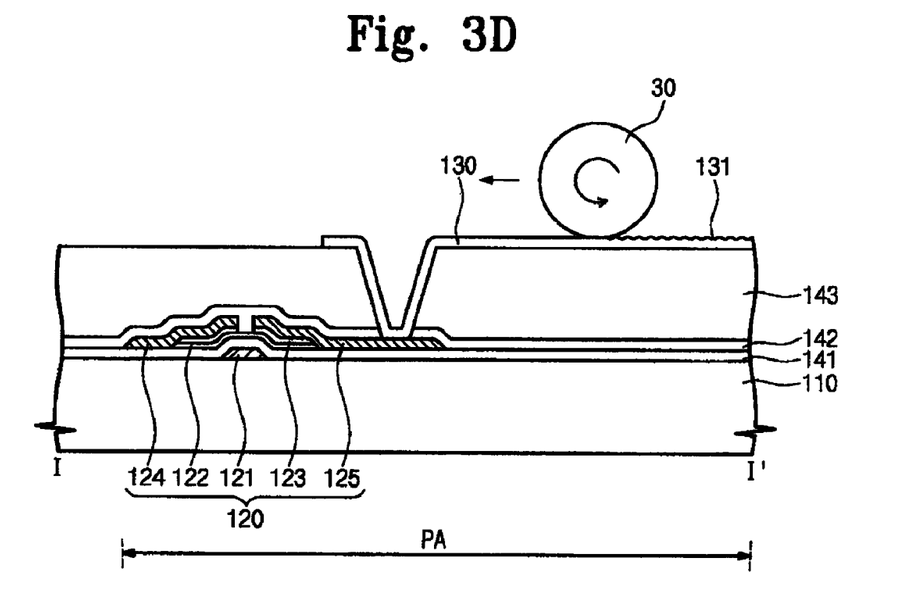

Referring to FIGS. 3C and 3D, a krypton fluoride laser 20 is irradiated onto the first alignment layer 150 to allow the first alignment layer 150 to have electrical conductivity, so that the pixel electrode 130 is formed. Irradiation of an alignment layer that includes polyimide by a krypton fluoride laser 20 to increase the electrical conductivity of the alignment layer has been suggested by Feurer's dissertation published in Journal of Applied Physics, issued in 1993 (T. Feurer et al., Applied Physics A, vol. 56, Issue 3, p. 275~281, 1993). In accordance with the Feurer's dissertation, when the krypton fluoride laser 20 irradiates the alignment layer including the polyimide, the electrical conductivity of the alignment layer increases by about $10^{16}$.

Then, when a rubbing roller 30 is disposed on an upper face of the pixel electrode 130 and is moved along the upper face of the pixel electrode 130, the first alignment pattern 131 is formed on the upper face of the pixel electrode 130. The rubbing roller 30 is provided with a rubbing fabric to form the first alignment pattern 131.

As above-described, since the pixel electrode 130 is formed using the first alignment layer 150 that is coated in each pixel region PA by the inkjet method, an additional process that patterns the first alignment layer 150 for the pixel electrode 130 using additional mask does not need to be performed on the first alignment layer 150. Further, the pixel electrode 130 includes the polyimide material having the electrical conductivity generated by irradiating the krypton fluoride laser 20 onto the polyimide material, so that the pixel electrode 130 may be provided with the first alignment pattern 131 formed thereon by using a rubbing method.

Figure 4:
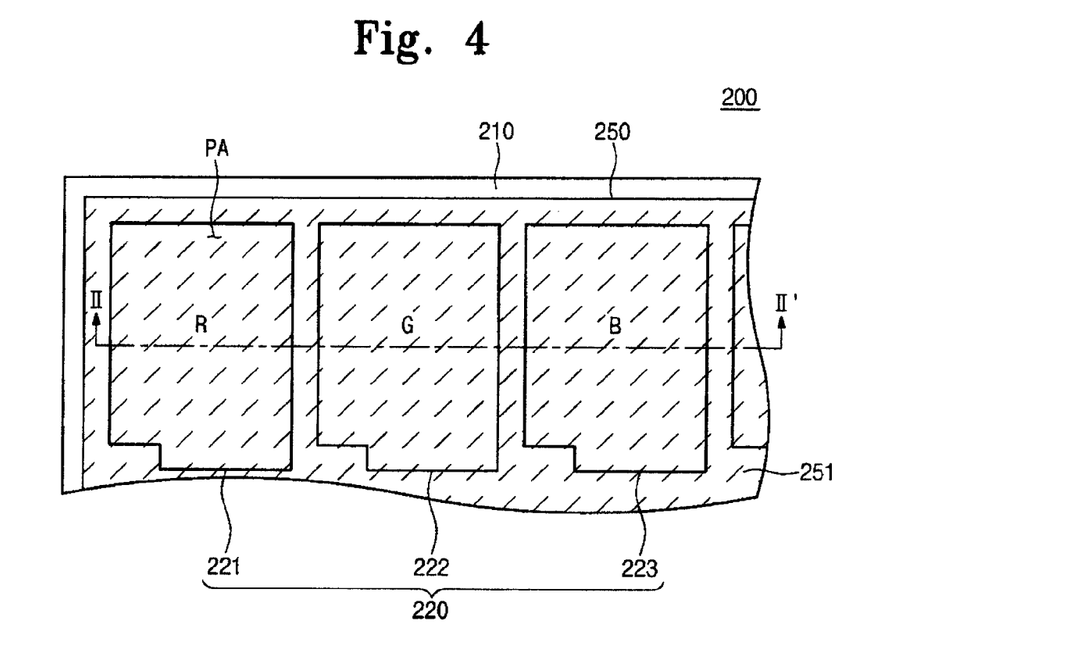
FIG. 4 is a plan view showing an exemplary embodiment of a color filter substrate for a liquid crystal display according to the present invention.
Figure 5:
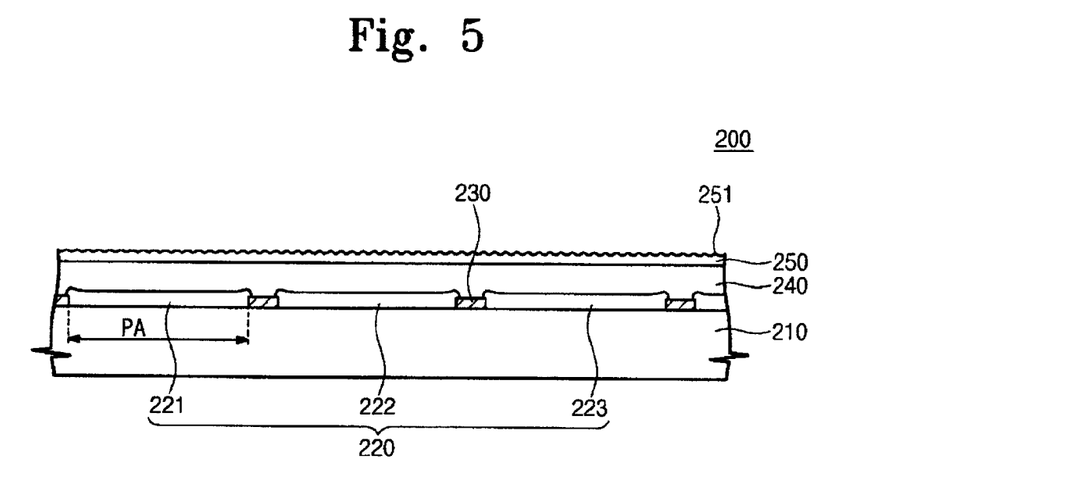
FIG. 5 is a cross-sectional view taken along a line II-II' of FIG. 4.

FIG. 4 is a plan view showing an exemplary embodiment of a color filter substrate for a liquid crystal display according to the present invention, and FIG. 5 is a cross-sectional view taken along a line II-II' of FIG. 4.

Referring to FIGS. 4 and 5, a color filter substrate 200 includes a second base substrate 210, a color filter 220, a black matrix 230, an overcoat layer 240, and a common electrode 250.

The second base substrate 210 includes the pixel regions PA arranged in an array form. The color filter 220 and the black matrix 230 are formed on the second base substrate 210. The color filter 220 includes color pixels, for example, a red color pixel 221, a green color pixel 222 and a blue color pixel 223, which display predetermined colors using the light. In the present exemplary embodiment, the red, green, and blue color pixels 221, 222 and 223 are in a one-to-one correspondence relationship with the pixel regions PA. The black matrix 230 is formed between the red, green, and blue color pixels 221, 222 and 223 to block the light.

The overcoat layer 240 is formed on the color filter 220 and the black matrix 230 to planarize an upper surface of the color filter substrate 200. The common electrode 250 is formed on the overcoat layer 240 to receive a common voltage. The common electrode 250 includes a conductive organic material, for example a conductive polymer. As an example of the present embodiment, the conductive organic material includes the conductive polyimide material. Also, the common electrode 250 is provided with a second alignment pattern 251 formed thereon to align the liquid crystal.

Accordingly, the color filter substrate 200 does not need to have a separate alignment layer applied thereto when the common electrode 250 including indium tin oxide or indium zinc oxide is applied to the color filter substrate 200. As a result, the manufacturing process and cost for the color filter substrate 200 may be reduced, thereby improving productivity.

Hereinafter, a method of forming the common electrode 250 will be described in detail with reference to drawings.

Figure 6A:
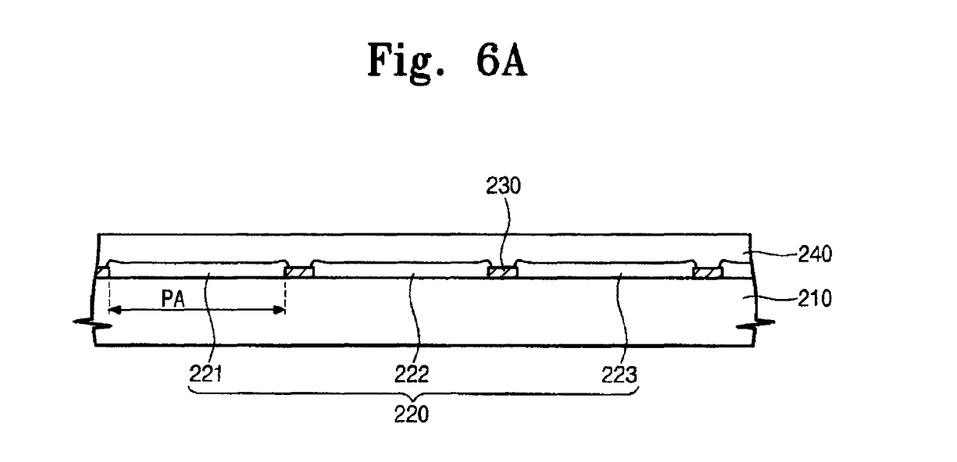
FIGS. 6A to 6C are sectional views illustrating a method of forming the color filter substrate shown in FIG. 5.
Figure 6B:
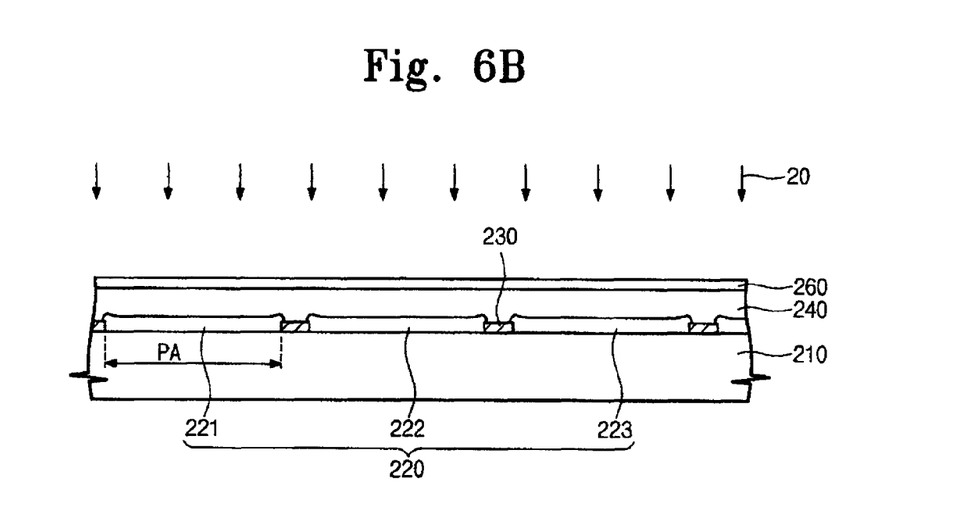
Figure 6C:
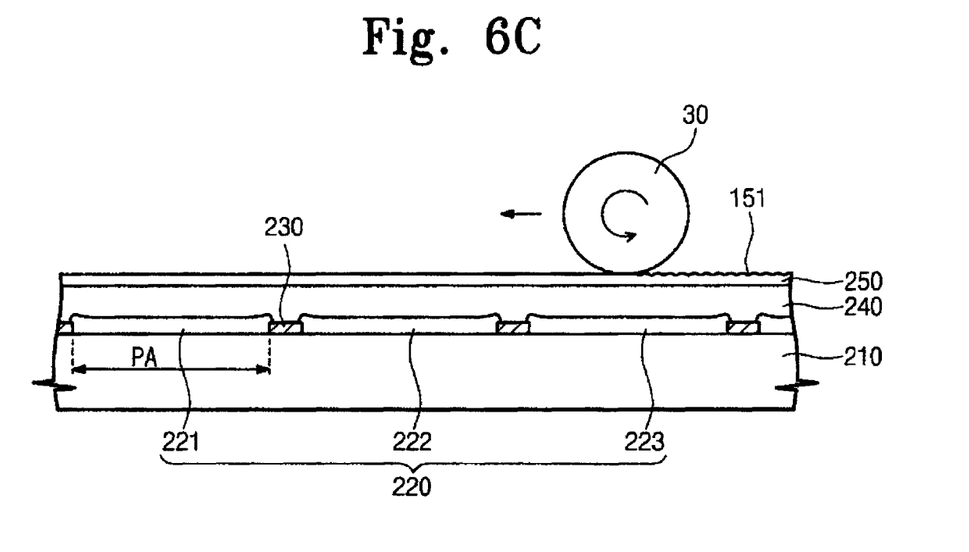

FIGS. 6A to 6C are sectional views illustrating a method of forming the color filter substrate shown in FIG. 5.

Referring to FIG. 6A, the color filter 220 and the black matrix 230 are formed on the second base substrate 210, and then the overcoat layer 240 is formed on the color filter 220 and the black matrix 230.

Referring to FIGS. 6B and 6C, a second alignment layer 260 including the polyimide is coated over the overcoat layer 240. The second alignment layer 260 may be formed by the inkjet method applied when the first alignment layer 150 is formed as shown in FIG. 3B, or may be formed by a rolling method using a roller.

Then, the krypton fluoride laser 20 is irradiated onto the second alignment layer 260 to allow the second alignment layer 260 to have the electrical conductivity, so that the common electrode 250 is formed.

When the rubbing roller 30 is disposed on an upper face of the common electrode 250 and is moved along the upper face of the common electrode 250, the second alignment pattern 251 is formed on the upper face of the common electrode 251.

As described above, since the common electrode 250 includes the polyimide material having the electrical conductivity generated by irradiating the krypton fluoride laser 20 onto the polyimide material, so that the common electrode 250 may be provided with the second alignment pattern 251 formed thereon by using a rubbing method. Thus, the manufacturing cost of the color filter substrate 200 may be reduced, and the productivity of the color filter substrate 200 may be enhanced.

Figure 7:
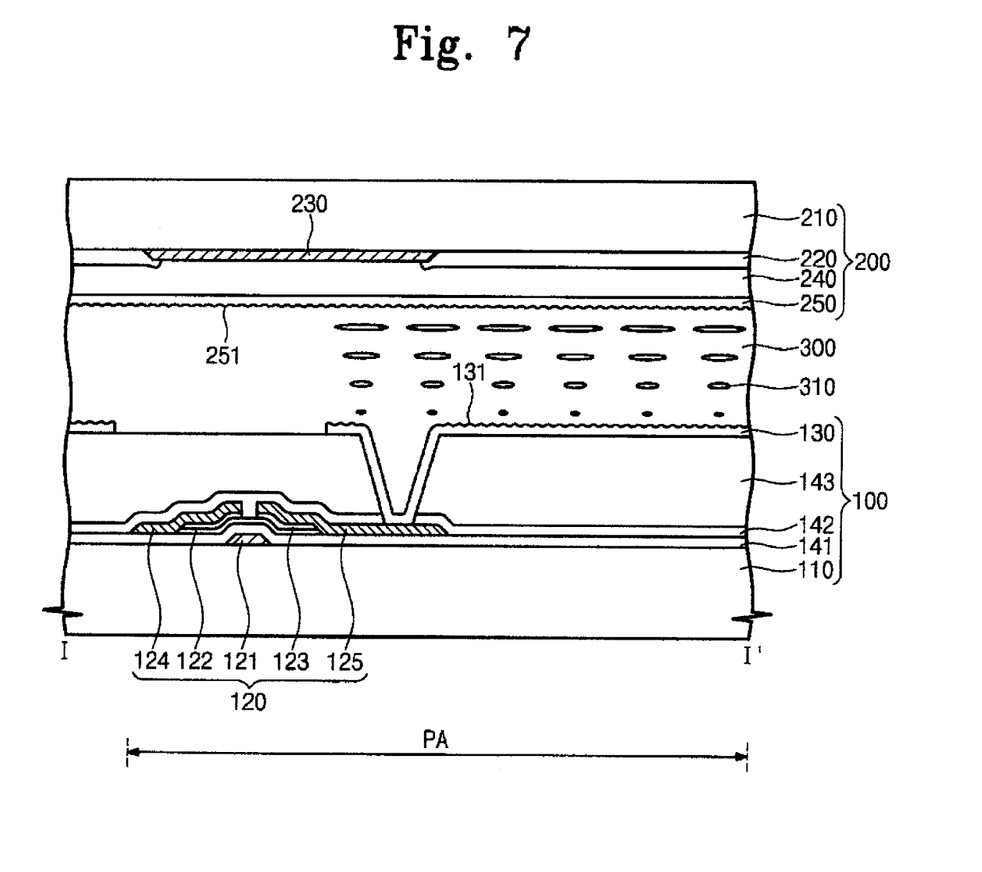
FIG. 7 is a cross-sectional view showing an exemplary embodiment of a liquid crystal display according to the present invention.

FIG. 7 is a cross-sectional view showing an exemplary embodiment of a liquid crystal display according to the present invention.

Referring to FIG. 7, a liquid crystal display panel 400 includes the array substrate 100, the color filter substrate 200 facing the array substrate 100, and a liquid crystal layer 300 disposed between the array substrate 100 and the color filter substrate 200.

In the present exemplary embodiment, the array substrate 100 has same structure and function as those of the array substrate shown in FIGS. 1 and 2, and the color filter substrate 200 has also same structure and function as those of the color filter substrate shown in FIGS. 4 and 5. Thus, detailed descriptions of the array substrate 100 and the color filter substrate 200 will be omitted in order to avoid redundancy.

The array substrate 100 includes the first base substrate 110, the gate line GL (refer to FIG. 1), the data line DL (refer to FIG. 1), the thin film transistor 120 and the pixel electrode 130. The pixel electrode 130 includes the conductive polyimide and is provided with the first alignment pattern 131 formed thereon to align the liquid crystal molecules 310 of the liquid crystal layer 300. The array substrate 100 may further include insulation layers as the gate insulation layer 141, the protection layer 142, and the organic insulation layer 143.

The color filter substrate 200 is positioned at an upper portion of the array substrate 100 such that the color filter substrate 200 faces the array substrate 100. The color filter substrate 200 includes the second base substrate 210, the color filter 220, the black matrix 230, the overcoat layer 240, and the common electrode 250. The common electrode 250 includes the conductive polyimide material and is provided with the second alignment pattern 251 formed thereon to align the liquid crystal molecules 310 of the liquid crystal layer 300. In the present exemplary embodiment, the second alignment pattern 251 is formed in a direction substantially perpendicular to the first alignment pattern 131.

As described above, the pixel electrode 130 and the common electrode 250 include the conductive polyimide material and are provided with the first and second alignment patterns 131 and 251 formed thereon, respectively. Thus, the array substrate 100 and the color filter substrate 200 do not need to have separate alignment layer, thereby reducing the manufacturing cost and the process complexity for the liquid crystal display panel 400 and enhancing the productivity of the liquid crystal display panel 400.

The liquid crystal layer 300 controls the transmittance of the light passing therethrough in accordance with the electric field formed between the pixel electrode 130 and the common electrode 250. The light exiting through the liquid crystal layer 300 is provided to the color filter 220, so that the image may be displayed on the liquid crystal display panel 400.

Figure 8:
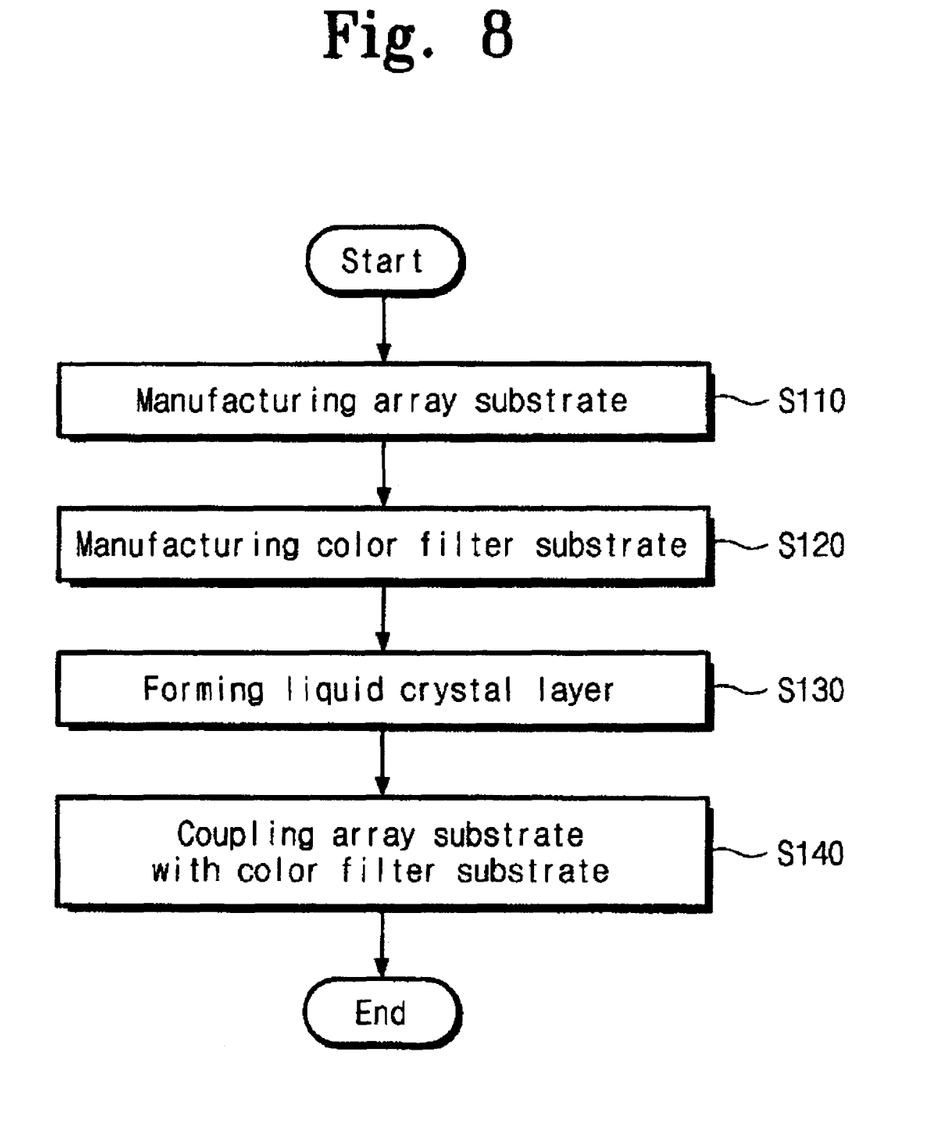
FIG. 8 is a flowchart illustrating a method of manufacturing the liquid crystal display panel according to the present invention.

FIG. 8 is a flowchart illustrating a method of manufacturing the liquid crystal display panel according to the present invention.

Referring to FIGS. 7 and 8, the gate line GL, the data line DL, the thin film transistor 120, the pixel electrode 130, the gate insulation layer 141, the protection layer 142 and the organic insulation layer 143 are formed on the first base substrate 110, so that the array substrate 100 is completed (S110). In the present exemplary embodiment, the process of manufacturing the array substrate 100 is identical with the process of manufacturing the array substrate shown in FIGS. 3A to 3D, and thus detailed description of the process for the array substrate 100 will be omitted.

Then, the color filter 220, the black matrix 230, the overcoat layer 240 and the common electrode 250 are formed on the second base substrate 210, so that the color filter substrate 200 is completed (S120). In the present exemplary embodiment, the process of manufacturing the color filter substrate 200 is identical with the process of manufacturing the color filter substrate shown in FIGS. 6A to 6C, and thus detailed description of the process for the color filter substrate 100 will be omitted.

The liquid crystal molecules 310 are dropped onto any of the array substrate 100 and the color filter substrate 200 to form the liquid crystal layer 300 (S130)

The array substrate 100 is coupled with the color filter substrate 200 while disposing the liquid crystal layer 300 between the array substrate 100 and the color filter substrate 200, so that the liquid crystal display panel 400 is completed (S140). In the present exemplary embodiment, the array substrate 100 and the color filter substrate 200 are coupled with each other after the liquid crystal layer 300 is formed on the array substrate 100 or the color filter substrate 200. However, the liquid crystal layer 300 may be formed by a vacuum injection method after coupling the array substrate 100 with the color filter substrate 200.

According to the above, the pixel electrode and the common electrode include the conductive polyimide material and are provided with the alignment pattern formed thereon, respectively. Thus, the liquid crystal display panel does not need to have the separate alignment layer, so that the manufacturing cost and the process complexity may be reduced and the productivity may be enhanced.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A method of manufacturing a liquid crystal display panel, the method comprising:
    forming a thin film transistor on a first base substrate to switch a pixel voltage;
    forming a first alignment layer on the first base substrate, the first alignment layer being in contact with the thin film transistor;
    irradiating a light onto the first alignment layer to convert the first alignment layer into a pixel electrode having an electrical conductivity and receiving the pixel voltage;
    patterning a surface of the pixel electrode to form a first alignment pattern to align liquid crystal molecules;
    forming a second alignment layer on a second base substrate;
    irradiating the light onto the second alignment layer to convert the second alignment layer into a common electrode having an electrical conductivity and receiving a common voltage;
    patterning a surface of the common electrode to form a second alignment pattern to align the liquid crystal molecules; and
    forming a liquid crystal layer having the liquid crystal molecules between the pixel electrode and the common electrode.

2. The method of claim 1, wherein
the first alignment layer comprises a polyimide.

3. The method of claim 2, wherein the second alignment layer a comprises polyimide.

4. The method of claim 1, wherein the light comprises a krypton fluoride laser.

5. The method of claim 3, wherein the first alignment layer and the second alignment layer are formed by an inkjet method.

6. The method of claim 3, wherein the surfaces of the first alignment layer and the second alignment layer are patterned by a rubbing method.

7. The method of claim 1, further comprising forming an insulating layer on the first base substrate,
    wherein the insulating layer has a contact hole to partially expose the thin film transistor, and
    wherein the first alignment layer is formed on the insulating layer and connected to the thin film transistor through the contact hole.

* * * * *